United States Patent [19]

Takasaki et al.

[11] Patent Number: 5,412,742
[45] Date of Patent: May 2, 1995

[54] METHOD FOR THE DETECTION OF LINE WIDTH OF LINE IMAGE IN IMAGE PROCESSOR

[75] Inventors: Naruto Takasaki; Yutaka Tanaka, both of Yokohama, Japan

[73] Assignee: Hitachi Software Engineering Co., Ltd., Kanagawa, Japan

[21] Appl. No.: 841,408

[22] Filed: Feb. 26, 1992

[30] Foreign Application Priority Data

Feb. 26, 1991 [JP] Japan ................... 3-030551

[51] Int. Cl.⁶ .............................. G06K 9/30
[52] U.S. Cl. ....................... 382/316; 382/203
[58] Field of Search .......... 382/60, 25, 27, 30, 382/48, 8, 45

[56] References Cited

U.S. PATENT DOCUMENTS

| | | | |
|---|---|---|---|
| 4,363,103 | 12/1982 | Richard et al. | 382/60 |
| 4,718,105 | 1/1988 | Lipkie et al. | 382/28 |
| 4,827,527 | 5/1989 | Morita et al. | 382/48 |
| 4,933,865 | 6/1990 | Yamamoto | 382/25 |

FOREIGN PATENT DOCUMENTS

62-269276  11/1987  Japan .

*Primary Examiner*—Joseph Mancuso
*Attorney, Agent, or Firm*—Fay, Sharpe, Beall, Fagan, Minnich & McKee

[57] ABSTRACT

An image processor for performing trace processing for tracing the line image has an image memory for storing image data, a data memory for storing graphic data, a display unit for displaying the image data and the graphic data, an input unit for entering trace designation, a semi-automatic image trace processing section for performing the trace processing for tracing the line image of the image data in a semi-automatic way, and a tracing-rule description processing section for designating a trace method for tracing the line image. The line width of the line image is detected by designating a point in the vicinity of a pixel line as a start point for detecting the line width of the line image as an object of tracing the image data, retrieving a change point for changing pixels on a contour of the line image from the start point, and detecting the line width by detecting the number of the pixels in a continuous pixel line arranged in the line-width direction of the line image from the change point.

13 Claims, 6 Drawing Sheets

METHOD FOR THE DETECTION OF LINE WIDTH OF LINE IMAGE IN IMAGE PROCESSOR

BACKGROUND OF THE INVENTION

The present invention relates to a method for the detection of a line width of a line image in an image processor and, more particularly, to a method for the detection of a line width of a line image in an image processor, such as a computer-aided design apparatus for operating graphics, so adapted as to detect the line width of the line image as an object of tracing and to set a tracing rule for tracing the line image, when a line width of image data is traced in a semi-automatic way.

Heretofore, a general input method for entering a drawing written on paper into a graphic processing system involves entering the drawing as image data by the aid of an image scanner or the like, displaying the image data on a display screen through the graphic processing system, and entering the image data by tracing the image data displayed on the display screen with a pointing device or the like manually by an operator.

For instance, Japanese Patent Laid-open Publication (kokai) No. 62-269,276/1987 discloses a conversational graphic input system which comprises entering a drawing as image data into a computer by the aid of an image scanner, displaying the image data on a display screen so as to be superimposed on center line image data, and entering the graphics as vector data by designating necessary positions of the graphics on the display screen by the aid of a coordinate indicator.

When the image data are converted into, for example, graphic data such as vector data or the like, center data of the center (center line) of an image are given, data of necessary characteristic points, such as end points, branch points, corner points and so on, of the image are selected from the center line of the continuous center data, and the data therefor are designated and entered. In this case, the center data are displayed on the display screen so as to be superimposed on the image data in order to enter the characteristic point, thereby enabling an operator to easily determine the characteristic point and allowing the characteristic point to be entered by an input designation from the operator. This system, however, suffers from the disadvantage that items to be displayed on the display screen become so complex that the operator cannot select required data in an efficient fashion.

On the other hand, a graphic processing apparatus or system has been developed, which is provided with a semi-automatic image trace processing function so arranged as to trace an image point in a semi-automatic way, determine characteristic points and enter graphic data of the characteristic points in an image processor.

The semi-automatic image trace processing function of such an image processor allows a tracing rule, such as a line width of a line as the object of tracing and a method for the correction of a shape, to be set manually as a parameter.

It is noted, however, that when the trace processing is implemented for semi-automatically tracing the line image in the image data by the aid of the semi-automatic image trace processing function of the image processor, the operator sets a parameter for the line width of an image to be traced by estimating an approximate line width in the descriptive processing of the tracing rule of the semi-automatic image trace processing function, while looking at the line image displayed on the display screen of a display unit. In this case, however, the problem may arise that the line width of the line image is too difficult to determine with accuracy when the operator sets the line width thereof by eye estimation while looking at the image displayed on the display screen, because eye estimation of the image displayed on the display screen may vary with magnification at the time of displaying the image on the screen.

SUMMARY OF THE INVENTION

The object of the present invention is to provide a method for the detection of a line width of a line image in an image processor, so adapted as to detect the line width of line image data in a semi-automatic way and to easily set the line width of the image as the object of tracing in the trace processing for tracing the image.

In order to achieve the aforesaid object, the present invention consists of a method for the detection of a line width of a line image in an image processor for performing trace processing for tracing the line image on the basis of a trace designation, the image processor having an image memory for storing image data, a data memory for storing graphic data, a display unit for displaying the image data and the graphic data, an input unit for entering the trace designation, a semi-automatic image trace processing section for performing the trace processing for tracing the line image of the image data, and a tracing-rule description processing section for designating a trace method for tracing the line image, which is characterized by designating a point near the line image to be traced as a start point for detecting the line width of the line image, retrieving a change point for changing pixels on a contour of the line image from the start point, and detecting the line width by detecting the number of pixels in a continuous pixel line arranged in the line-width direction of the line image from the change point.

The number of the pixels in the continuous pixel line arranged in the line-width direction of the line image is detected by changing the directions of detecting the number of the pixels in the continuous pixel line from one side of the contour of the line image, and the minimum value of the detected number of the pixels in the continuous pixel line is determined as the line width of the line image.

Further, in order to determine the line width of the line image with more accuracy, the minimum value of the detected number of the pixels in the continuous pixel line has been determined as the line width thereof by detecting the number of the pixels in the continuous pixel line arranged in the line-width direction of the line image by changing the directions of detecting the number of the pixels in the continuous pixel line from one side of the contour of the line image, followed by the detection of the number of the pixels in the continuous pixel line arranged in the line-width direction of the line image by changing the directions of detecting the number of the pixels in the continuous pixel line from the other side of the contour of the line image, and by the determination of the minimum value of the detected number of the pixels in the continuous pixel line as the line width of the line image. The line image as the object of detecting its line width is designated by determining the line image located within a predetermined scanning range in the vicinity of an input coordinate position on the basis of the coordinate position to be entered from the input unit, and the line width of the line image as the object of detecting is determined by detecting the number of the pixels in the continuous pixel line existing in the direction perpendicular to the direction of advance of the line of the line image. The detected line width of the line image is automatically set as a tracing line width of the line image to be traced on the basis of the tracing rule in the tracing-rule description processing section for performing the semi-automatic image trace processing.

In accordance with the method for the detection of the line width of the line image in the image processor as described hereinabove, a pixel change point at which the pixels are changed is retrieved from the start point on the contour of the line image merely by designating a point near the line pixel as a start point for detecting the line width of the line image as the object of tracing the image data, and the number of the pixels in the continuous pixel line is detected in the line-width direction of the image data from the pixel change point on the contour of the line image, thereby detecting the line width thereof automatically. The number of the pixels in the continuous pixel line in the line-width direction of the image data is detected by changing the directions of detecting the number of the pixels in the continuous pixel line from one side of the contour of the line image, and the minimum value of the detected number of the pixels in the continuous pixel line is determined as the line width of the line image. The more accurate detection of the number of the pixels in the continuous pixel line in the line-width direction of the image data is made by changing the directions of detecting the number of the pixels in the continuous pixel line from one side of the contour of the line image and then by changing the directions of detecting the number of the pixels in the continuous pixel line from the other side of the contour thereof, thereby determining the minimum value of the detected number of the pixels in the continuous pixel line as the line width of the line image. This manner of determining the line width of the line image allows the line width of the line image to be detected with more accuracy even if the line image to be detected would be in the form of a curved line image.

In addition, the line widths of the line image are detected at plural positions and an average of the line widths thereof is determined as the line width. In this case, the designation of the line image as the object of detecting the line widths is made by determining the line image within a predetermined scanning range in the vicinity of an input coordinate position on the basis of the coordinate position to be entered from the input unit, and the line width of the line image is determined by detecting the number of the pixels in the continuous pixel line existing in the direction perpendicular to the direction of advance of the line of the line image. The detected line width of the line image is automatically set as the tracing line width of the line image to be traced on the basis of the tracing rule in the tracing-rule description processing section for performing the semi-automatic image trace processing.

In other words, when the line width of the line image as the object of tracing is designated in the image processor having the semi-automatic image trace processing section, the number of the pixels in the continuous pixel line in the line-width direction of the image data is detected merely by designating the point in the vicinity of the line image to be detected as the start point, then the line width of the line image is estimated, and the estimated line width thereof is automatically set as the tracing line width to be traced on the basis of the tracing rule. The line width of the line image can be detected, for example, by detecting the point on the contour of the line image within the predetermined range closer to the point designated as the start point and by tracing the pixels one after another in the line-width direction of the line image. The line widths of the line image can be detected in plural positions and an average of the detected line widths thereof is given, followed by reporting the average to an operator and displaying it on the display screen. The operator can then describe the line width of the line image to be traced on the basis of the average of the line widths as the tracing line width for the tracing rule in the tracing-rule description processing section for performing the semi-automatic image trace processing. This system allows the operator to set the line width of the line image as a definite figure in a more accurate manner than conventional systems in which the line width thereof is ambiguously determined by eye estimation.

DESCRIPTION OF THE PREFERRED EMBODIMENTS

Figure 1:
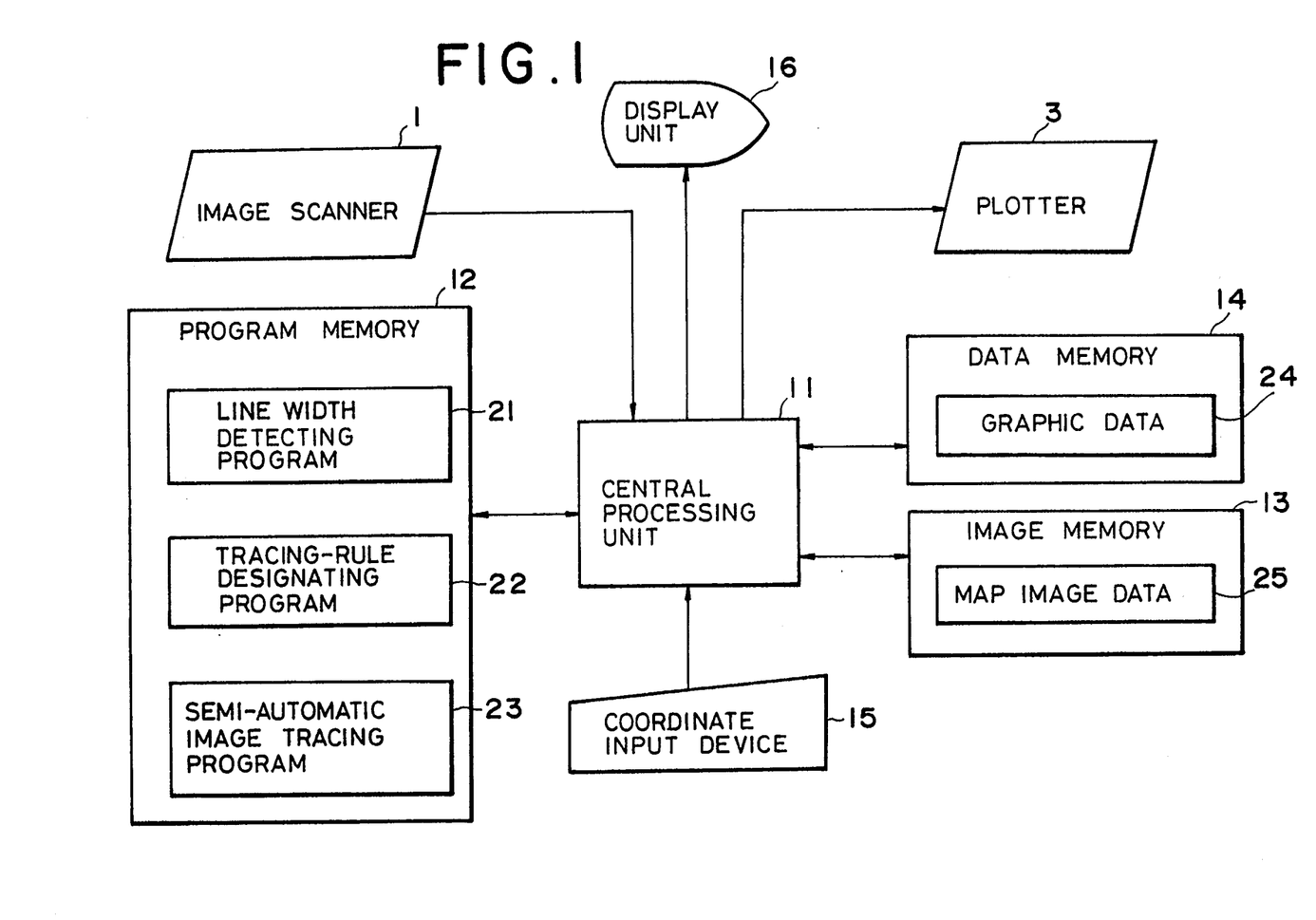
FIG. 1 is a block diagram showing the system configuration of the image processor according to an embodiment of the present invention.

FIG. 1 is a block diagram showing the system configuration of the image processor according to an embodiment of the present invention. The image processor is arranged as a system which is applicable to a map drawing. As shown in FIG. 1, the system configuration of the image processor is composed of an input section of an image scanner 1 for reading the original drawing as image data, an image processor body, and an output section of a plotter 3 for generating graphic data processed.

The image processor body comprises a central processing unit 11 for implementing various program processing, a program memory 12 for storing programs necessary for processing to be implemented by the central processing unit 11, an image memory 13, a data memory 14, a coordinate input device 15, and a display unit 16 for displaying various data on a display screen. Stored in the program memory 12 are a line width detecting program 21 for determining the line width of a line image, a tracing-rule designating program 22 for describing a tracing rule in a semi-automatic image tracing program, and a semi-automatic image tracing program 23 for implementing semi-automatic image trace processing. Stored in the image memory 13 are map image data 25 to be read from the image scanner 1. The data memory 14 stores graphic data for map image data 31 converted by the semi-automatic image trace processing.

As the coordinate input device 15, there may be employed a pointing device such as a mouse, a digitizer or the like. The coordinate data are entered on the basis of the cursor position on the display screen of the display unit 16. The coordinate input device 15 may be employed in association with the display output onto the display screen of the display unit 16, and it may also be employed as a conversational input device for entering the input designation from the operator in a conversational way.

In the image processor having the system configuration as described hereinabove, the semi-automatic image tracing program 23 is arranged to implement the trace processing for tracing a continuous black pixel line represented by the map image data 25 of the image memory 13 on the basis of the tracing rule set by the tracing-rule designating program 22 and to register the graphic data 24 in the data memory 14.

FIGS. 2, 3, 4, 5 and 6 are schematic representations showing the sequence of the operation for the line width detection processing for detecting the line width of the line image. Description will now be made of the sequence of the procedures for detecting the line width of the line image with reference to FIGS. 2 to 6, inclusive. It is noted herein that, given that contours of the map image data 25 are displayed on the display screen of the display unit 16 and that the contours contain wider lines at intervals of several lines of the contours, an appropriate tracing line width should be described as the tracing rule in the semi-automatic image trace processing, in order to distinguish the wider lines from ordinarily wide lines and recognize the wider lines.

Figure 2:
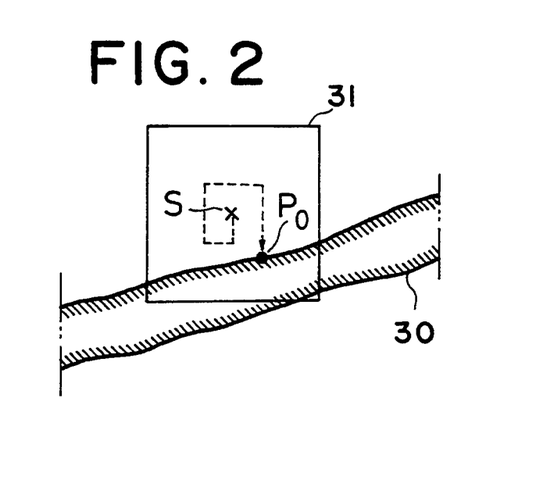
FIG. 2 is a schematic representation showing the first stage of the operation for processing the detection of the line width of a line image.

As shown in FIG. 2, a point S positioned in the vicinity of a line image 30 whose line width is to be detected is first designated as a start point for starting processing for determining the line width of the line image. Then, a predetermined range in the vicinity of the start point S is set as a scanning range 31 for retrieval, and pixels are retrieved in a spiral manner from the start point S within the scanning range 31 for retrieval, thereby giving a change point P0 at which a black pixel exists, i.e. at which the state of the pixels changes from the state in which no black pixel exists to the state in which a black pixel exists, or vice versa, i.e. at which the state of the pixels changes from the state in which a black pixel exists to the state in which no black pixel exists. This procedure gives the point on the contour of the line image 30 as the start point for the line width detection processing.

Figure 3:
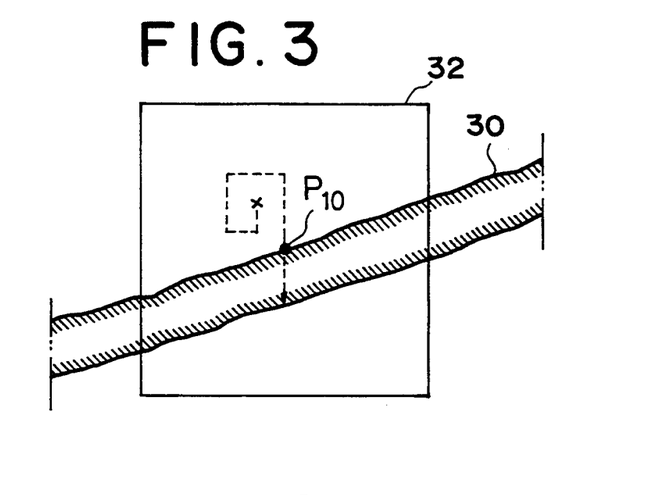
FIG. 3 is a schematic representation showing the second stage of the operation for processing the detection of the line width of the line image.

Then, as shown in FIG. 3, the line width detection processing is started by setting the given change point P0 as a start point P10 for starting the line width detection processing for detecting the line width of the line image and setting an image-data range 32 having a predetermined range for implementing the line width detection processing for the line image 30.

Figure 4:
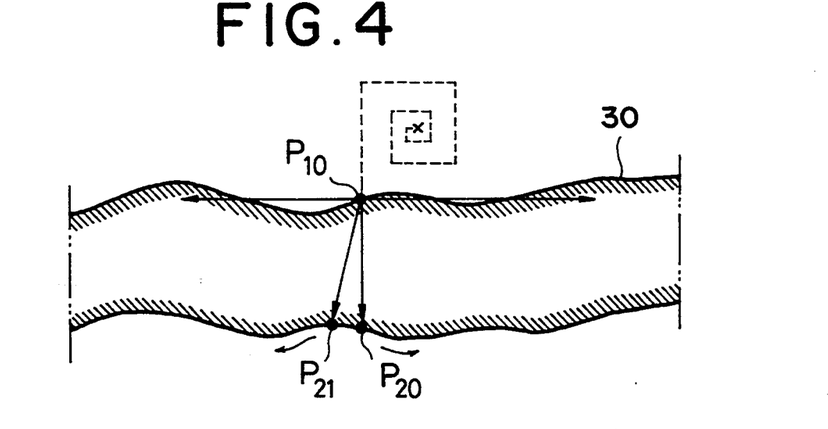
FIG. 4 is a schematic representation showing the third stage of the operation for processing the detection of the line width of the line image.

After the line width detection processing has been started, the line width of the line image is implemented in the manner as disclosed in FIG. 4. In other words, the pixels are retrieved one after another from the start point P10 in the direction perpendicular to or horizontal to the start point P10, thereby determining a change point 20 at which no black pixel exists any more. The change point P20 is then moved on the contour of the line image 30 by a predetermined distance in the left direction or in the right direction, thereby giving a change point P21 at which no black pixel exists any more in the line-width direction and which is located in the position closest to the start point P10.

In this case, when the given change point P21 exists on the same side of the line image 30 as the start point P10 and the change point P21 coincides with the start point P10, the direction of retrieval of the continuous pixel line is changed, followed by continuing the retrieval in the same manner as described hereinabove to thereby find another change point P20 at which the state of the pixels changes from the state in which the black pixel exists to the state in which no black pixel exists any more.

Figure 5:
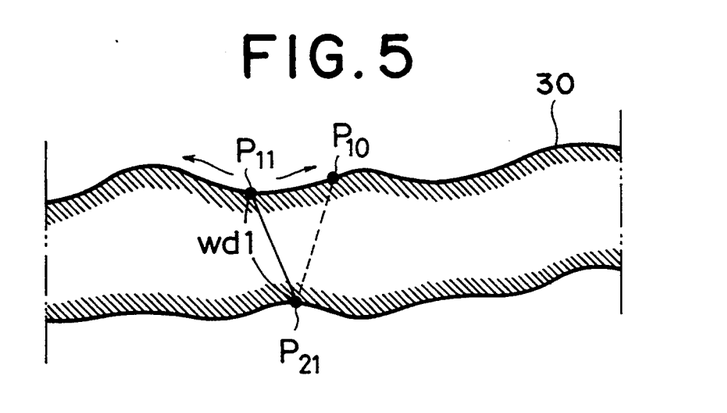
FIG. 5 is a schematic representation showing the fourth stage of the operation for processing the detection of the line width of the line image.

When the change point P21 has been found on the other side of the contour of the line image 30 opposite to the side on which the processing was started from the change point P10 on the contour of the line image 30, the change point P10 is then moved on the contour of the line image 30, thereby finding another change point P11 which is located in the position closest to the change point P21 positioned on the opposite side of the line image 30, as shown in FIG. 5. Then, a distance between the change point P11 and the change point P21 is given, and this distance is determined as a line width wd1.

Figure 6:
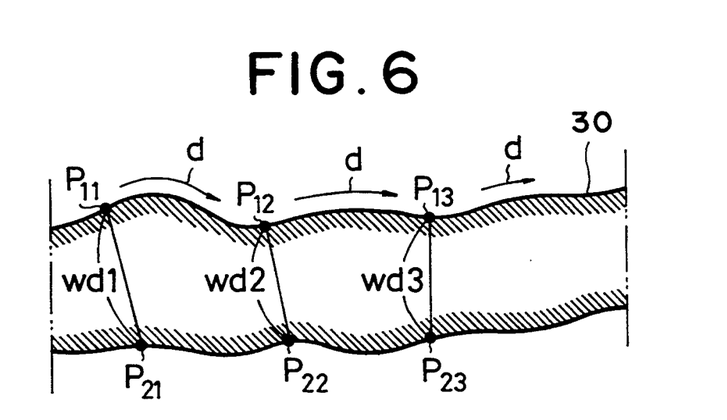
FIG. 6 is a schematic representation showing the fifth stage of the operation for processing the detection of the line width of the line image.

Then, as shown in FIG. 6, the change point P11 is moved on the contour of the line image 30 one after another by a sufficiently long distance d in the direction of advance of the line image 30, thereby setting further start points P12, P13 etc. for re-starting the line width detection processing in the same manner as described hereinabove. Similarly, change points P22, P23 etc. are determined, in the same manner as the change point P21 has been determined as described hereinabove, as the respective points closest to the corresponding change points P12, P13 positioned on the opposite side of the contour of the line image 30, and the respective distances between the change points P12 and P22, P13 and P23 etc. are determined as line widths wd2, wd3 etc.

Other change points may be determined in the same manner as described hereinabove and the corresponding distances between the change points positioned on the one side of the contour of the line image 30 and the change points positioned on the opposite side thereof are determined as line widths. Then, an average of all the line widths, including the line widths wd1, wd2, wd3, etc., is given and a tracing rule is set by employing the average of the line widths as a tracing line width for the line image as the object of tracing.

As described hereinabove, the line widths of the line image 30 are determined in plural positions by moving the change points on the contour of the line image 30 one after another by sufficiently long distances d, so that when the change point goes across the image data range 32 having the predetermined range for implementing the line width detection processing or when the change point reaches the end point of the predetermined range, the corresponding change point is omitted from sampling line widths. This procedure can give an appropriate line width for the line image to be detected.

Figure 7:
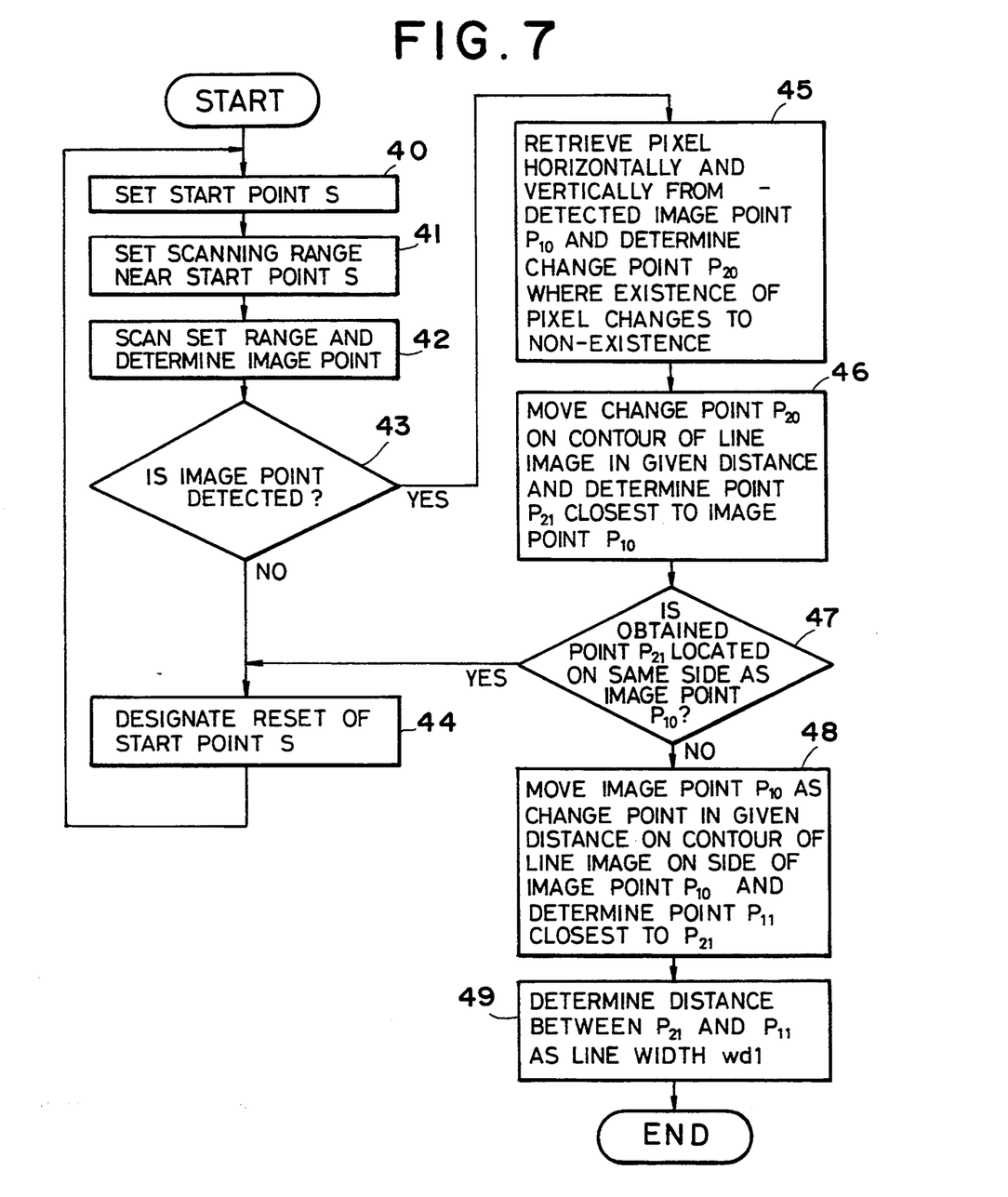
FIG. 7 is a flow chart showing a processing flow of a line width detecting program for detecting the line width of the line image.

FIG. 7 is a flow chart showing an example of a processing flow of the line width detecting program for detecting the line width of the line image. Description will now be made of the line width detection processing with reference to FIG. 7.

First, at step 40, the start point S for retrieving pixels of the line image is set, followed by step 41 at which a scanning range is set in the range in the vicinity of the start point S. Then, the program flow goes to step 42 at which an image point is determined by scanning the set scanning range, as the point at which the pixels change from the state in which no black pixel exists to the state in which the black pixel exists. Then, at step 43, a decision is made to determine if the image point has been detected. When no image point has been detected, on the one hand, then the program flow is returned at step 44 to step 40 for designating the re-set of the start points because the previous setting of the start point S was found to be inappropriate. When it is decided at step 43 that the image point has been detected, on the other hand, then the program flow proceeds to step 45 at which the processing for detecting the line width of the line image is started by setting the detected image point as the start point P10 for starting the line width detection processing.

In the line width detection processing at step 45, the pixels are retrieved in the horizontal direction or in the vertical direction from the detected image point P10 to find a change point P20 at which the state of the pixels changes from the state in which a black pixel exists to the state in which no black pixel exists. Then, at step 46, the change point P20 is moved on the contour of the line image by a predetermined distance, thereby determining a point P21 closest to the image point P10. The program flow then goes to step 47 at which a decision is made to determine if the point P21 is positioned on the same side of the contour of the line image as the side on which the image point P10 exists. If it is decided at step P47 that the point P21 is positioned on the same side as the image point P10, then the program flow is returned to step 44 because the setting of the start point S and of the direction of retrieving the continuous pixel line was found to be inappropriate in this case. At step 44, the re-setting of the start point S is designated, followed by the return of the program flow to step 40 at which a new start point S is set for repeating the implementation of the line width detection processing in the manner as described hereinabove.

On the other hand, when it is decided at step 47 that the point P21 is positioned on the side of the line image opposite to the side on which the image point P10 exists, then the program flow goes to step 48 and the original image point P10 is moved as a change point by a predetermined distance on the contour of the line image on which the image point P10 exists, thereby determining a point P11 which is located in the position closest to the point P21. Then, at step 49, the distance between the points P11 and P21 is determined and set as a line width wd1, followed by finishing the processing for the detection of the line width of the line image.

Figure 8:
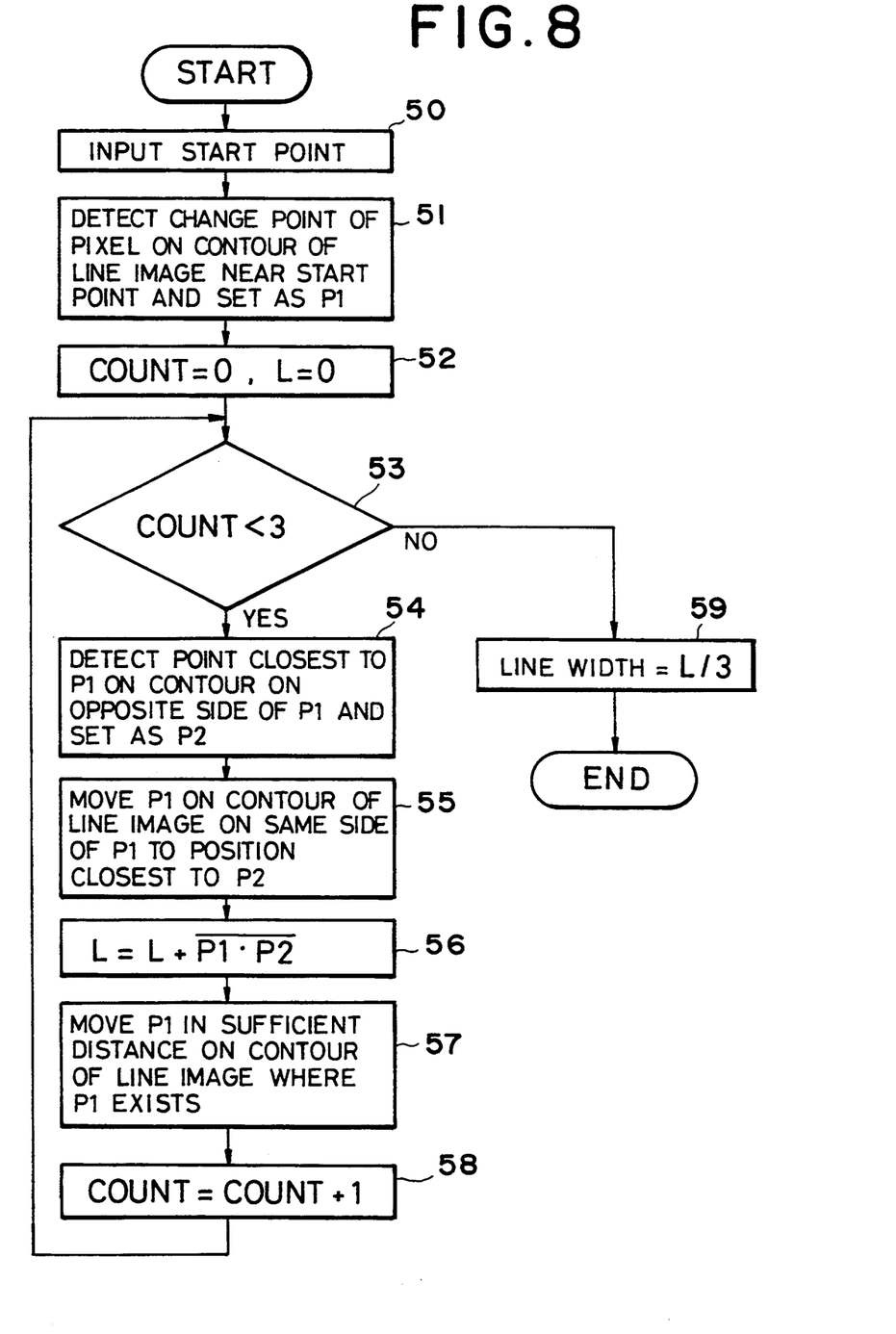
FIG. 8 is a flow chart showing another example of the processing flow of a line width detecting program for detecting the line width of the line image.

FIG. 8 is a flow chart showing another example of the processing flow of the line width detecting program for detecting the line width of the line image. In the example as shown in FIG. 8, the line widths of the line image are given in three positions and an average of the three line widths is determined as a line width thereof. The line width detection processing is described with reference to FIG. 8.

First, at step 50, the start point is designated and entered on the display screen, followed by step 51 at which a change point at which the state of the pixels changes is detected on the contour of the line width in the vicinity of the start point and the change point is set as a change point P1. Then, at step 52, a control variable COUNT and a variable L are set to initial values, i.e. COUNT=0 and L=0. Then, the program flow goes to step 53 at which a decision is made to determine if the control variable COUNT is smaller than 3. When it is decided at step 53 that the control variable COUNT is smaller than 3, then the program flow goes to step 54 from which the substantial processing for the detection of the line width of the line image is implemented.

Then, at step 54, a point P2 is given, which exists in the position on the contour of the line image on the side opposite to the side on which the change point P1 exists and which is closest to the change point P1 in the line-width direction of the line image. The program flow then goes to step 55 at which the change point P1 is moved on the contour of the line image on which the change point P1 exists, to the position closest to the point P2 in the line-width direction thereof. Thereafter, at step 56, the distance between the points P1 and P2 is added to the variable L for giving an average, followed by proceeding to step 57 at which the point P1 is moved a sufficiently long distance on the contour of the line image on which the point P1 exists, in order to implement the processing for determining the line width in the position which follows. Then, at step 58, the control variable COUNT is increased by an increment of one, followed by the return to step 53 from which the processing is repeated. This procedure can allow the line width detection processing to be implemented in three different positions on the contour of the line image, and the line-widthwise distance determined between the corresponding points is added to the variable L. When the processing for detecting the line width is repeated three times, the decision at step 53 to determine if the control variable COUNT is smaller than three is found in the negative. Then, the program flow goes to step 59 at which an average of the line widths is computed from the variable L, thereby finishing a series of the line width detection processing.

As described hereinabove, the method for the detection of the line width of the line image according to the present invention can provide the operator with the line width of the line image to be traced in the image data of, for example, a contour map as a definite value, thereby enabling the line width of the line image as the object of tracing to be easily set in the tracing rule for the semi-automatic image trace processing.

In the processing for detecting the line width of the line image as shown in the flow chart of FIG. 8, the line widths of the line image are determined in three positions on the contour of the line image in order to give an average of the line widths of the line image, however, sampling points for determining the line widths of the line image can be set in any position. For instance, start points may be set manually one after another as sampling points in order to determine the line widths of the line image, thereby giving an average of the line widths of the line image as a line width thereof. Further, a range may be preset for detecting the line widths of the line image and the sampling may be implemented at constant intervals within the preset range.

Figure 9:
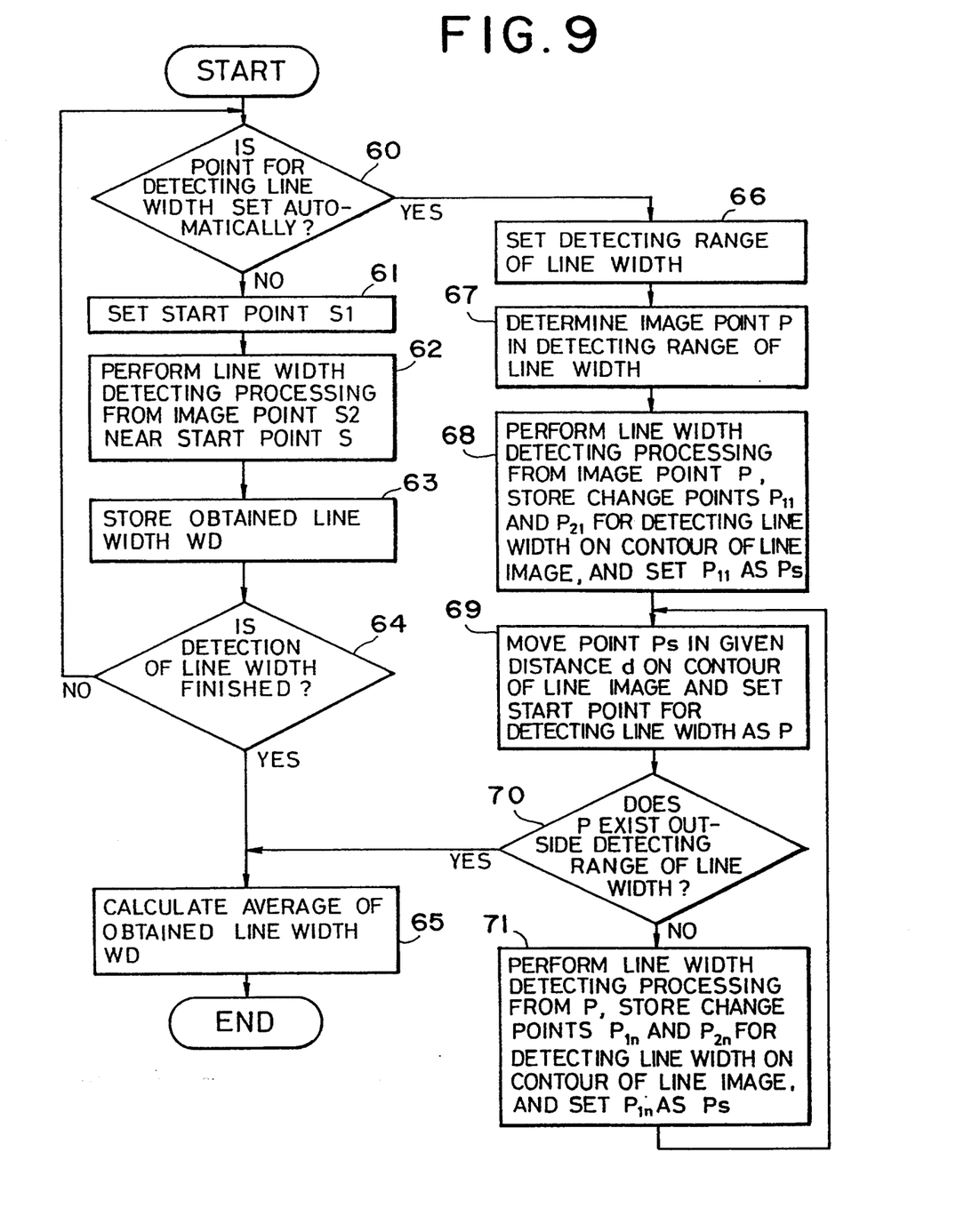
FIG. 9 is a flow chart showing an example of a processing flow of a line width detecting program for detecting an average of line widths of the line image detected in plural positions.

FIG. 9 is a flow chart showing an example of the processing flow for the line width detecting program for detecting an average of line widths of the line image in plural positions. In the line width detection processing of the example as shown in FIG. 9, a decision is made at step 60 to determine if the points for detecting the line width of the line image are arranged so as to be set automatically. When it is decided at step 60 that the point for detecting the line width thereof is to be set manually, then the program flow goes to step 61 at which the start point S is set manually, followed by step 62 at which the line width detection processing is started from an image point S2 located in the vicinity of the start point S1, thereby giving a line width WD. The given line width WD is stored at step 63, and a decision is made at step 64 to determine if the detection of the line width of the line image has been finished. If it is decided at step 64 that no line width detection processing has been finished, on the one hand, then the program flow is returned to step 60 from which the processing is repeated. On the other hand, when it is decided at step 64 that the processing for detecting the line widths of the line image has been ended at appropriate times and the operator designates the end of the line width detection processing, then the program flow goes to step 65 at which an average of the given line widths WD is determined, followed by the end of the processing.

On the other hand, when it is decided at step 60 that the point for detecting the line width of the line image is set automatically, then the program flow proceeds to step 66 at which the range for detecting the line width thereof is set. Then, at step 67, an image point P is determined within the range for detecting the line width thereof, followed by step 68 at which the line width is detected from the image point P to detect the change points P11 and P21 on both of the sides of the contour of the line image and to determine the line width WD1 between the change points P11 and P21. The change points P11 and P21 as well as the line width WD1 are stored, and the change point P11 is set as a point Ps.

Then, at step 69, the point Ps is moved the predetermined distance d on the contour of the line image, and the start point P for starting the detection of the line width of the line image is determined. The program flow then proceeds to step 70 at which a decision is made to determine if the start point P is located within the preset range for detecting the line width of the line image. When it is decided at step 70 that the start point P is located within the preset range, on the one hand, then the program flow proceeds to step 71 at which the line width detection processing is implemented from the start point P, thereby determining and storing the change points P1n and P2n, at which the pixels change, as well as the line width WDn between the change points P1n and P2n. The change points P1n and P2n as well as the line width WDn are stored, and the change point P1n is set as a new point Ps. Then, the program flow is returned to step 69 from which the processing is repeated.

When the result of decision at step 70 indicates that the start point P for starting the detection of the line width of the line image is located outside the set range from detecting the line width thereof, on the other hand, it is decided that the processing for detecting individual line widths of the line image has been finished, so that the program flow proceeds to step 65 at which an average of the given line widths WD (WD1-WDn) is computed, followed by the end of a series of the processing.

This manner of detecting the line widths of the line image as described hereinabove involves setting the sampling point in a certain position on the contour of the line image for providing an average of the line widths thereof, determining the line widths thereof by setting appropriate start points one after another as sampling points, for example, by manual operation, and computing the average of the line widths thereof. Further, a region may be preset as a range for detecting the line widths of the line image, the line widths thereof within the preset range for detecting the line widths thereof may be determined by setting the points for detecting the line widths thereof one after another by sampling them at constant intervals within the preset range, and an average of the line widths thereof may be computed. These procedures can provide the operator with the line widths of the line image as the object of tracing as definite values, for example, for the image data of a contour map. Further, the line widths of the line image as the object of tracing can easily be set in the tracing rule for the semi-automatic image trace processing.

As described hereinabove, the present invention allows the operator to detect the line width of the line image as the object of tracing merely by designating the point near the line image and to set the line width thereof with high accuracy on the basis of the line width or line widths detected, when the tracing rule is set for implementing the image tracing in a semi-automatic fashion for the image processor.

The foregoing description is made of the present invention by way of examples. It is to be noted, however, that the present invention is not construed in any respect to be restricted to those examples as described hereinabove and that the present invention is understood as a matter of course to encompass every modification, variation and change within the scope and spirit of the invention.

What is claimed is:

1. In a line image processing method for tracing a line image on the basis of a tracing rule defined in terms of a parameter of the line image, the improvement comprising the steps of:

designating a point near the line image to be traced as a start point;

retrieving a first beginning point on a first contour edge of the line image from the start point;

retrieving a first ending point on a second contour edge of the line image from the first beginning point;

detecting the number of pixels in a first continuous pixel line arranged in the line-width direction of the line image from the first beginning point to the first ending point as the line width of the line image; and tracing the line image according to a tracing rule that is defined using the detected line width as a parameter of the tracing rule.

2. A method as claimed in claim 1, further comprising the steps of:

retrieving a second ending point on the second contour edge of the line image;

detecting the number of pixels in a second continuous pixel line in the line-width direction of the line image from the first beginning point to the second ending point; and determining the number of pixels of the shorter of the first and second continuous pixel lines as the line width in the tracing rule.

3. A method as claimed in claim 2, further comprising the steps of:

detecting the number of pixels in a third continuous pixel line in the line-width direction by connecting a second beginning point on the first contour of the line image and the second ending point, and determining the number of pixels connecting the second beginning point and the second ending point as the line width in the tracing rule.

4. A method as claimed in claim 1, wherein the line width of the line image is automatically set in the tracing rule for tracing the line image.

5. A method as claimed in claim 1, further comprising the steps of:

performing the first beginning point-retrieving, first ending point-retrieving and detecting steps in plural positions of the line image to compile a plurality of line widths as sampling values;

determining an average of the line widths thereof; and automatically determining the average of the plurality of line widths as the line width in the tracing rule.

6. A method as claimed in claim 5, wherein, when the line widths of the line image are detected in plural positions of the line image as sampling values and when a position in which the line width thereof is detected reaches an end point of the line image or exceeds the end point thereof, the end point position or excessive position is removed as a sampling value.

7. A method as claimed in claim 1, wherein the designating step is performed so that the start point is selected within a predetermined scanning range of the line image whose line width is to be detected.

8. A method as claimed in claim 7, wherein the first beginning point-retrieving step includes the step of scanning from the start point in a spiral manner to the first beginning point, and wherein the first beginning point is the first pixel of the line image whose line width is to be detected that is encountered during the spiral scan.

9. A method as claimed in claim 1, wherein the start point is designated manually by inputting an input coordinate position corresponding to the start point.

10. In a semi-automatic line image tracing method for tracing a line image on the basis of a tracing rule defined in terms of a parameter of the line image, the improvement comprising the steps of:

manually designating a non-image point within a predetermined scanning range of a line image to be traced;

deriving a first line width-determining point on the line image from the non-image point;

deriving a second line width-determining point of the line image from the first line width-determining point, said first and second line width-determining points being respectively located on first and second opposed contour edges of the line image to be traced;

determining the line width of the line image between the first and second line width-determining points; and tracing the line image according to a tracing rule that is defined using the line width determined by the determining step as a parameter of the tracing rule;

wherein all steps but the designating step are performed automatically.

11. A semi-automatic line image tracing method as claimed in claim 10, further comprising the steps of:

deriving a third line width-determining point on the second contour edge, said third line width-determining point being nearer to the first line width-determining point than the second line width-determining point is to the first line width-determining point; and determining the line width of the line image between the first line width-determining point and the third line width-determining point;

wherein the tracing step is performed using the minimum line width determined by the determining steps.

12. A semi-automatic line image tracing method as claimed in claim 11, further comprising the steps of:

deriving a fourth line width-determining point on the first contour edge such that the fourth line width-determining point is nearer to the third line width-determining point than the first line width-determining point is to the third line width-determining point; and determining the line width of the line image between the fourth line width-determining point and the third line width-determining point;

wherein the tracing step is performed using the minimum line width determined by the determining steps.

13. In a semi-automatic image trace processing method for tracing a line image on the basis of a tracing rule defined in terms of a parameter of the line image, the improvement comprising the steps of:

manually designating a non-image point within a predetermined scanning range of a line image to be traced;

deriving a first line width-determining point on the line image from the non-image point;

deriving a second line width-determining point of the line image from the first line width-determining point, said first and second line width-determining points being respectively located on first and second opposed contour edges of the line image to be traced;

determining the line width of the line image between the first and second line width-determining points;

deriving a first plurality of line width-determining points on the first contour edge, in addition to the first line width-determining point, and a second plurality of line width-determining points on the second contour edge, in addition to the second line width-determining point, the second plurality of line width-determining points having a one-to-one correspondence with the first plurality of line width-determining points;

determining respective line widths of the line image between the corresponding first and second pluralities of line width-determining points;

determining the average of all determined line widths; and tracing the line image according to a tracing rule defined using the average line width as a parameter of the tracing rule;

wherein all steps but the designating step are performed automatically.

* * * * *